United States Patent Office 3,176,015
Patented Mar. 30, 1965

3,176,015
PHENTHIAZINE DERIVATIVES
Robert Michel Jacob, Ablon, and Gilbert Louis Regnier, Paris, France, assignors to Societe des Usines Chimiques Rhone-Poulenc, Paris, France, a French body corporate
No Drawing. Filed Nov. 19, 1956, Ser. No. 622,740
Claims priority, application France, Nov. 25, 1955, 703,310; Aug. 16, 1956, 57,583
8 Claims. (Cl. 260—243)

This invention relates to new derivatives of phenthiazine and to processes for their production.

It is known that various 10-aminoalkyl-phenthiazines possess interesting therapeutic properties. Extensive research and experimentation has shown, however, that both the size of the therapeutic index and the nature of the therapeutic effect exhibited by certain compounds of this type can radically be changed (even eliminated) by even small changes in chemical structure. Particularly is this the case with variations in the nature and length of the side chain attached to the 10-position nitrogen atom and with positional substitution in the phenthiazine nucleus.

It has now unexpectedly been discovered that the hitherto unknown phenthiazine derivatives of the general formula:

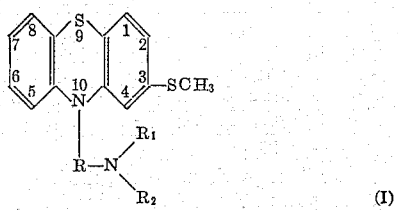

(I)

and their salts and their quaternary ammonium derivatives (wherein $R_1$ and $R_2$ are the same or different and either each represents a lower alkyl group or one of $R_1$ and $R_2$ represents a hydrogen atom and the other represents a lower alkyl group or $R_1$ and $R_2$ together with the adjacent nitrogen atom collectively represent a heterocyclic group such as pyrrolidino, piperidino, morpholino, piperazino or 4-alkylpiperazino, and B represents a straight or branched chain divalent aliphatic hydrocarbon group containing 2 to 5 carbon atoms unsubstituted or substituted by a group $$-A-N\begin{matrix}R_1\\R_2\end{matrix}$$

wherein A represents a single bond or —$CH_2$— and $R_1$ and $R_2$ are as hereinbefore defined) have a pronounced effect on the central nervous system. Accordingly they may, in general, be used as anti-emetics, potentiators of general anaesthetics or neuroleptics.

Compounds which have an outstanding effect on the central nervous system are those in which the group B is

—$CH_2$—$CH_2$—$CH_2$— or

and especially those in which furthermore the grouping

represents dimethylamino, diethylamino, pyrrolidino, piperazino, 4-methylpiperazino or 4-ethylpiperazino, the compounds 3-methylthio - 10 - (3-dimethylaminopropyl)-phenthiazine, 3-methylthio-10-(3-dimethylamino-2-methylpropyl)phenthiazine, 3-methylthio-10-(3,4'-methyl-1'-piperazino-propyl)phenthiazine and 3-methylthio-10-(3,4'-methyl-1'-piperazino-2-methylpropyl)phenthiazine being particularly outstanding and powerful potentiators of general anaesthetics, neuroleptics and antiemetics. In addition some, in particular those derivatives in which the grouping

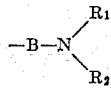

represents

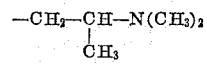

or

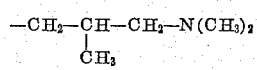

i.e. 3-methylthio-10-(2-dimethylaminopropyl)phenthiazine and 3 - methylthio-10-(3-dimethylamino-2-methylpropyl)phenthiazine, are powerful antihistaminics. Those derivatives in which the chain B carries another amino group

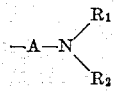

are particularly interesting as spasmolytics and local anaesthetics, and of particular importance are those compounds in which the group B is

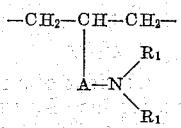

especially 3-methylthio - 10 - [2,3-bis(dimethylamino)-1-propyl]phenthiazine which possesses a particularly intense spasmolytic action.

The term "lower alkyl" as used in this specification and in the appended claims means that the alkyl group contains not more than five carbon atoms.

The new phenthiazine compounds of the present invention may be prepared in a number of different ways.

Preferred processes of manufacture are as follows:

(1) Interaction of 3-methylthiophenthiazine with a halogenoamine of the formula:

(II)

(where Hal represents a halogen atom and the other symbols are as hereinbefore defined). In the case where $R_1$ represents a hydrogen atom and $R_2$ represents a lower alkyl group it is advantageous to carry out the reaction with an N-acyl derivative of the halogenoamine and subsequently to hydrolyse the product obtained.

The reaction may be carried out with or without a solvent in the presence or absence of a condensing agent. It is advantageous to operate in an aromatic hydrocarbon solvent (for example, toluene or xylene) in the presence of a condensing agent, preferably in the form of an alkali metal or derivative thereof (such as, for example, hydride, amide, hydroxide, alcoholate or metal alkyl or aryl) and especially metallic sodium, sodamide, powdered sodium or potassium hydroxide, lithium hydride, sodium tert-butylate, butyl lithium and phenyl lithium. The reaction is preferably carried out at the boiling temperature of the solvent. It is advantageous to use the halogenoamine in the form of the free base in solution, for example, with benzene, toluene or xylene, and to add this to the mixture of the other reactants in which the 3-methylthiophenthiazine may already be present at least in part, in the form of an alkali metal salt. The reaction may also be carried out using a salt of the halogenoamine but in this case a greater proportion of the condensing agent must clearly be used in order to neutralise the acid of the salt employed.

In the case where the divalent aliphatic hydrocarbon group —B— is an asymmetric branched chain, such for example, as

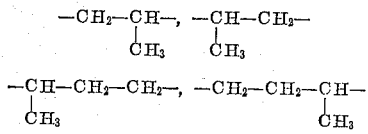

isomerisation can take place during the course of the reaction. This isomerisation is analogous to that which takes place in the preparation of promethazine by the condensation of phenthiazine with a dimethylaminohalogenopropane [Charpentier, C. R. 225, 306 (1947)], which gives with 2-dimethylamino-1-chloropropane or with 1-dimethylamino-2-chloropropane as starting material the same final mixture in which promethazine predominates.

(2) Condensation of an amine of the formula

(wherein $R_1$ and $R_2$ are as hereinbefore defined) with a phenthiazine derivative of the general formula:

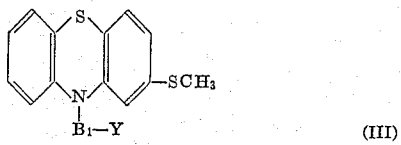

wherein Y represents a residue of a reactive ester, such as a halogen atom or a residue of a sulphuric or sulphonic ester, and $B_1$ represents a straight or branched divalent aliphatic hydrocarbon group containing 2 to 5 carbon atoms or such a grouping substituted by a group —A—$Y_1$, A being as hereinbefore defined and $Y_1$ being a residue of a reactive ester or a grouping

The reaction conditions described for process (1) are also applicable to this method.

(3) In the case of compounds in which $R_1$ represents a hydrogen atom and $R_2$ represents a lower alkyl group or $R_1$ and $R_2$ both represent lower alkyl groups, alkylation by known methods (for example, methylation with formaldehyde and hydrogen in the presence of a catalyst) of the corresponding primary or secondary amines. It is sometimes more advantageous to carry out the alkylation in two stages, by acylation followed by reduction, and these two operations may be carried out simultaneously in certain cases.

(4) Decomposition of a phenthiazine-10-carboxylate of an aminoalcohol of the formula:

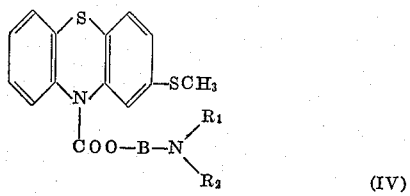

(wherein the various symbols are as hereinbefore defined) by heating the carboxylate to a temperature above 100° C., and preferably between 150 and 220° C. There is no advantage in operating at higher temperautres which, in any event, can cause discoloration of the reaction products.

The reaction can be effected with the phenthiazine-10-carboxylate alone, i.e. without a diluent, or in an inert medium such as liquid paraffin, diphenyl or diphenyl oxide, or in the classical diluents for decarboxylation, such, for example, as quinoline or weak bases with a sufficiently high boiling pont, or in solution in a chlorinated aromatic compound, such as o-dichlorobenzene.

During the course of the decomposition of the phenthiazine-10-carboxylate an isomerisation, similar to that hereinbefore described in process (1), takes place when the divalent aliphatic hydrocarbon group B is an asymmetric branched chain and a mixture of isomers is obtained. Separation of the isomers may be effected by, for example, fractional crystallisation of salts such as the hydrochlorides from a suitable solvent such as alcohol.

The phenthiazine-10-carboxylates employed as starting materials may be obtained by known methods. For example, they may be prepared by the action of a halide (or an ester) of 3-methylthiophenthiazine-10-carboxylic acid on the appropriate aminoalcohol; or by the action of a halogenoalkyl ester of such an acid on an appropriate secondary amine.

Certain of the compounds conforming to general Formula I have an asymmetric carbon atom in the chain B, such as those compounds with the branched chains

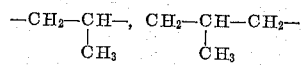

and consequently can exist in optically active forms. The invention includes within its scope the racemates as well as the corresponding optically active isomers of such compounds. The optically active isomers may be obtained by certain of the methods described above by commencing with starting materials which are themselves optically active. They may also be prepared by resolution of the corresponding racemates.

For therapeutic purposes, the bases of general Formula I are preferably employed in the form of acid addition salts containing pharmaceutically acceptable anions (such as hydrochlorides and other hydrohalides, 8-chlorotheophyllinates, phosphates, nitrates, sulphates, maleates, fumarates, citrates, tartrates, oxalates, methane sulphonates and ethane disulphonates) or of quaternary ammonium salts obtained by reaction with organic halides (e.g. methyl or ethyl iodide, chloride or bromide or allyl or benzyl chloride or bromide) or other reactive esters.

The following examples show how the invention may be put into practice. The melting points are those determined on the Kofler bench.

*Example I*

3-methylthiophenthiazine (4.9 g.), M.P. 136° C., is heated in boiling anhydrous xylene (50 cc.) with sodamide (0.88 g.) for 1 hour. 3-dimethylamino-1-chloropropane (2.71 g.) is added to the suspension of the sodium salt obtained and boiling is continued for 6 hours. The solution is then treated with water followed by dilute hydrochloric acid. After making alkaline with sodium hydroxide, extracting with ether and evaporating the solvent under reduced pressure, there is obtained 3-methylthio-10-(3-dimethylaminopropyl)phenthiazine (4.5 g.) B.P. 206-218° C./0.2 mm. Hg.

The corresponding hydrochloride crystallised from a mixture of acetone and ether melts at 160° C. The corresponding picrate crystallised from acetone melts at 135° C.

3-methylthiophenthiazine is obtained by cyclisation with sulphur of 3-methylthiodiphenylamine, B.P. about 160-186° C./0.12 mm. Hg and M.P. 58° C., itself prepared by the decarboxylation of 2-carboxy-3′-methylthiodiphenylamine, M.P. 140-141° C.

*Example II*

3-methylthiophenthiazine (4.9 g.) and sodamide (0.88 g.) are heated for 20 hours with 3-dimethylamino-2-methyl-1-chloropropane (3 g.) in boiling xylene. The suspension obtained is treated as in Example I and there is finally obtained 3-methylthio-10-(3-dimethylamino-2-methylpropyl)phenthiazine (4.6 g.), M.P. 88–89° C.

The corresponding picrate crystallised from ethanol melts at 145° C.

*Example III*

3-methylthiophenthiazine (4.9 g.), M.P. 136° C., is heated with sodamide (0.88 g.) in boiling anhydrous xylene (50 cc.) for one hour. 3,4'-methylpiperazinyl-1-chloropropane (3.94 g.) in solution in anhydrous xylene (75 cc.) is added and heated under reflux for 4 hours. The solution is then washed with water and extracted with dilute hydrochloric acid. After rendering alkaline with sodium hydroxide, extraction with ether and evaporation of the solvent under reduced pressure, 3-methylthio-10-(3,4'-methylpiperazinylpropyl)phenthiazine (4.4 g.) is obtained, B.P. 250–256° C./0.1 mm. Hg. The corresponding dihydrochloride crystallised from a mixture of acetone and ether melts at 220° C. (dec.). The corresponding dipicrate crystallised from a mixture of acetone and iso-propanol melts at 252–253° C.

By proceeding in a similar manner there may be obtained:

3 - methylthio-10-(2-dimethylaminopropyl)phenthiazine, B.P. 202–206° C./0.2 mm. Hg; hydrochloride, M.P. 205–206° C.; picrate M.P. 190° C., and 3 - methylthio - 10 - (3 - pyrrolidinopropyl)phenthiazine, B.P. 261°/0.9 mm. Hg; hydrochloride, M.P. 161° C.

*Example IV*

A solution of 3,4'-methylpiperazinyl-2-methylpropyl 3-methylthiophenthiazine-10-carboxylate (13.7 g.) in o-dichlorobenzene (60 cc.) is heated with boiling for 5 hours until carbon dioxide ceases to be evolved. After cooling, ether (60 cc.) is added to the reaction mixture which is then washed with water and extracted with 10% hydrochloric acid. The acid solution is made alkaline with sodium hydroxide (d.=1.33) and extracted with ether. After drying the ethereal solution over anhydrous sodium sulphate and distilling off the ether under reduced pressure, a crude base (11.25 g.) is obtained. By addition of an ethanolic solution of maleic acid there is obtained, after recrystallisation, 3-methylthio-10-(3,4'-methylpiperazinyl-2-methylpropyl)phenthiazine acid dimaleate, (12.7 g.) M.P. 199° C.

The ester starting material, the dihydrochloride of which melts at about 225° C., may be prepared by heating in toluene 3,4'-methylpiperazinyl-2-methylpropanol with 3-methylthiophenthiazine-10-carbonyl chloride, M.P. 125° C., itself obtained by the action of phosgene on 3-methylthiophenthiazine in toluene in the presence of pyridine.

*Example V*

A solution of 1,3-bis-dimethylamino-2-propyl 3-methylthiophenthiazine 10-carboxylate (12 g.), M.P. 103–104° C., in o-dichlorobenzene (60 cc.) is heated with boiling for 3 hours and the reaction mixture is treated as in Example I. A mixture of crude isomeric bases (10.25 g.) is obtained. After the addition of a solution of fumaric acid in ethanol to a solution of these bases in the same alcohol there is obtained, after recrystallisation from ethanol, 3-methylthio - 10 - (2,3-bis-dimethylaminopropyl)phenthiazine neutral fumarate (6 g.), M.P. 198° C.

The ester starting material is prepared as described in Example IV but using 1,3-bis-dimethylamino-2-propanol instead of 3,4'-methylpiperazinyl-2-methylpropanol.

*Example VI*

3 - methylthio - 10 - (3-toluene - p - sulphonyloxypropyl) phenthiazine (4.6 g.) in solution in anhydrous toluene (42 cc.) is heated with pure diethylamine (4.3 g.) in an autoclave for 3 hours at 100–110° C. After cooling, the crystalline suspension obtained is diluted with ether (100 cc.) and washed several times with water. It is then extracted with 10% hydrochloric acid. After rendering the acid extract alkaline with sodium hydroxide (d.=1.33) and extraction with ether, the ethereal solution is dried over anhydrous sodium sulphate and the ether distilled off under reduced pressure. A crude base (2.5 g.) is obtained. By the addition of an ethereal solution of hydrochloric acid to a solution of the base in acetone, 3-methylthio-10-(3-diethylaminopropyl)phenthiazine hydrochloride (2.1 g.), M.P. 172° C., is obtained.

3 - methylthio - 10 - (3 - toluene - p - sulphonyloxypropyl)phenthiazine may be obtained by condensing in pyridine toluene-p-sulphonyl chloride with 3-methylthio-10-(3-hydroxypropyl)phenthiazine, B.P. about 231–233° C./0.06 mm. Hg, itself obtained by the acid hydrolysis of 3 - methylthio-10-(3-tetrahydropyranyloxypropyl)phenthiazine obtained by the condensation in boiling xylene in the presence of sodamide of 3-tetrahydropyranyloxy-1-chloropropane with 3-methylthiophenthiazine.

Proceeding in a similar manner, there may be obtained 3 - methylthio - 10 - (3-monomethylaminopropyl)phenthiazine, the acid oxalate of which melts at 186° C.

*Example VII*

A solution in pure dioxane (30 cc.) of 3-methylthio-10-(3-aminopropyl)phenthiazine (2.8 g.) is neutralised with N hydrochloric acid (9.2 cc.). An aqueous 30% solution of formaldehyde (22.1 cc.) and platinum oxide (0.2 g.) is added to this solution. The mixture is strongly agitated under a slight pressure of hydrogen at room temperature for 48 hours. After removal of the platinum by filtration and evaporation of the solvent under reduced pressure, the residue obtained is treated with N hydrochloric acid (50 cc.), the insoluble matter is filtered off and the acid solution is made alkaline with sodium hydroxide (d.=1.33). After extraction with ether, the ethereal solution is dried over sodium sulphate and the ether removed by distillation. There is obtained 3-methylthio-10-(3-dimethylaminopropyl) phenthiazine (0.2 g.), the picrate of which melts at 135° C.

The initial 3 - methylthio-10-(3-aminopropyl)phenthiazine, the acid oxalate of which melts at 198° C., is prepared by heating in toluene at 110° C. 3-methylthio-10-(3-toluene-p-sulphonyloxypropyl)phenthiazine with an excess of ammonia.

We claim:

1. A compound selected from the group consisting of phenthiazine derivatives of the formula:

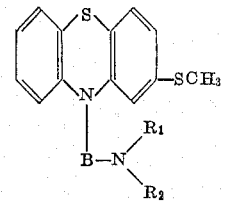

wherein

is a member of the class consisting of monomethylamino, monoethylamino, dimethylamino, diethylamino, pyrrolidino, piperidino, morpholino, piperazino, 4-methyl-piperazino- and 4-ethyl-piperazino, and B is a member of the class consisting of straight and branched chain divalent saturated aliphatic hydrocarbon groups containing 2 to 5 carbon atoms and their acid addition salts containing pharmaceutically acceptable anions.

2. 3-methylthio-10 - (3 - dimethylaminopropyl)phenthiazine.

3. 3-methylthio-10-(3-dimethylamino-2-methylpropyl)-phenthiazine.

4. 3-methylthio-10-(3-pyrrolidinopropyl)phenthiazine.

5. 3-methylthio-10-(3,4'-methyl-1'-piperazinylpropyl)-phenthiazine.

6. 3-methylthio-10-(3,4'-methyl-1'-piperazinyl-2-methyl-propyl)phenthiazine.

7. A compound of the formula:

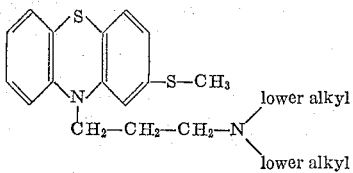

8. A compound having the formula:

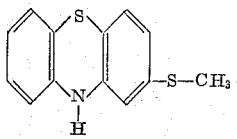

References Cited by the Examiner

UNITED STATES PATENTS

| | | | |
|---|---|---|---|
| 2,272,498 | 2/42 | Zerweck et al. | 260—243 |
| 2,534,237 | 12/50 | Cusic | 260—243 |
| 2,789,978 | 4/57 | Rath | 260—243 |
| 3,047,571 | 7/62 | Jacob et al. | 260—243 |

OTHER REFERENCES

Beilstein's Handbuch der Organischen Chemie, 4th ed., vol. 14, page 332 (system No. 1894), Julius Springer, Berlin, Germany (1936).

Chemical Abstracts, vol. 26, page 2184 (1932) [abstract of Sergeev, J. Gen. Chem. (USSR), vol. 1, pages 279–288 (1931)].

Magidson et al.: Ber. Deut. Chem., vol. 69, page 538 and 543 (1936).

WALTER A. MODANCE, *Primary Examiner.*

H. J. LIDOFF, *Examiner.*